United States Patent [19]
Stoyka

[11] Patent Number: 5,552,759
[45] Date of Patent: Sep. 3, 1996

[54] ELECTRONIC SYSTEM FOR DETECTING VEHICLE WHEEL THEFT

[76] Inventor: David S. Stoyka, 27050 Cedar Rd., Apt. No. 212, Beachwood, Ohio 44122

[21] Appl. No.: 333,406

[22] Filed: Nov. 2, 1994

[51] Int. Cl.⁶ .......................... B60R 25/10; G08B 13/14
[52] U.S. Cl. ...................... 340/426; 340/425.5; 340/429; 340/539; 340/568; 340/571; 340/693; 301/37.21; 116/28 R
[58] Field of Search ................. 340/426, 425.5, 340/429, 428, 539, 566, 665, 693, 568, 571, 572; 116/28 R, 33, 4; 301/37.1, 37.21

[56] References Cited

U.S. PATENT DOCUMENTS

| | | | |
|---|---|---|---|
| 4,284,973 | 8/1981 | Howell et al. | 340/429 |
| 4,361,827 | 11/1982 | Geller | 340/566 |
| 4,790,020 | 12/1988 | Lin | 381/156 |
| 4,947,151 | 8/1990 | Rosenberger | 340/429 |
| 4,979,219 | 12/1990 | Lin | 381/190 |
| 5,049,867 | 9/1991 | Stouffer | 340/426 |
| 5,061,917 | 10/1991 | Higgs et al. | 340/447 |
| 5,132,665 | 7/1992 | Hutchisson et al. | 340/463 |
| 5,254,897 | 10/1993 | Miller et al. | 310/319 |
| 5,300,875 | 4/1994 | Tuttle | 320/20 |

*Primary Examiner*—Donnie L. Crosland
*Attorney, Agent, or Firm*—Robert S. Nolan; Joseph M. Lafata

[57] ABSTRACT

An alarm system for detecting unauthorized removal of a wheel assembly or wheel accessory from the vehicle includes a sensor having a secured state and an unsecured state. The sensor is in the secured state when the wheel assembly or accessory is installed on the vehicle and in the unsecured state when it is removed from the vehicle. An alarm transmitter is connected to the sensor and alters a radio frequency (RF) alarm signal when the sensor changes from the secured state to the unsecured state. A receiver, located remotely from the alarm transmitter, receives the RF alarm signal and generates an alarm triggering signal in response thereto. The sensor and alarm transmitter are preferably part of a sensing assembly which includes a fastener for connecting the sensing assembly to a wheel lug or other wheel part. The sensing assembly includes a housing with a cavity for enclosing the sensor and the alarm transmitter. The sensor may be a pressure switch, an electronic switch or other sensing device. Different arrangements are disclosed for recharging an internal battery or other electrical energy storage device within the sensing assembly.

33 Claims, 5 Drawing Sheets

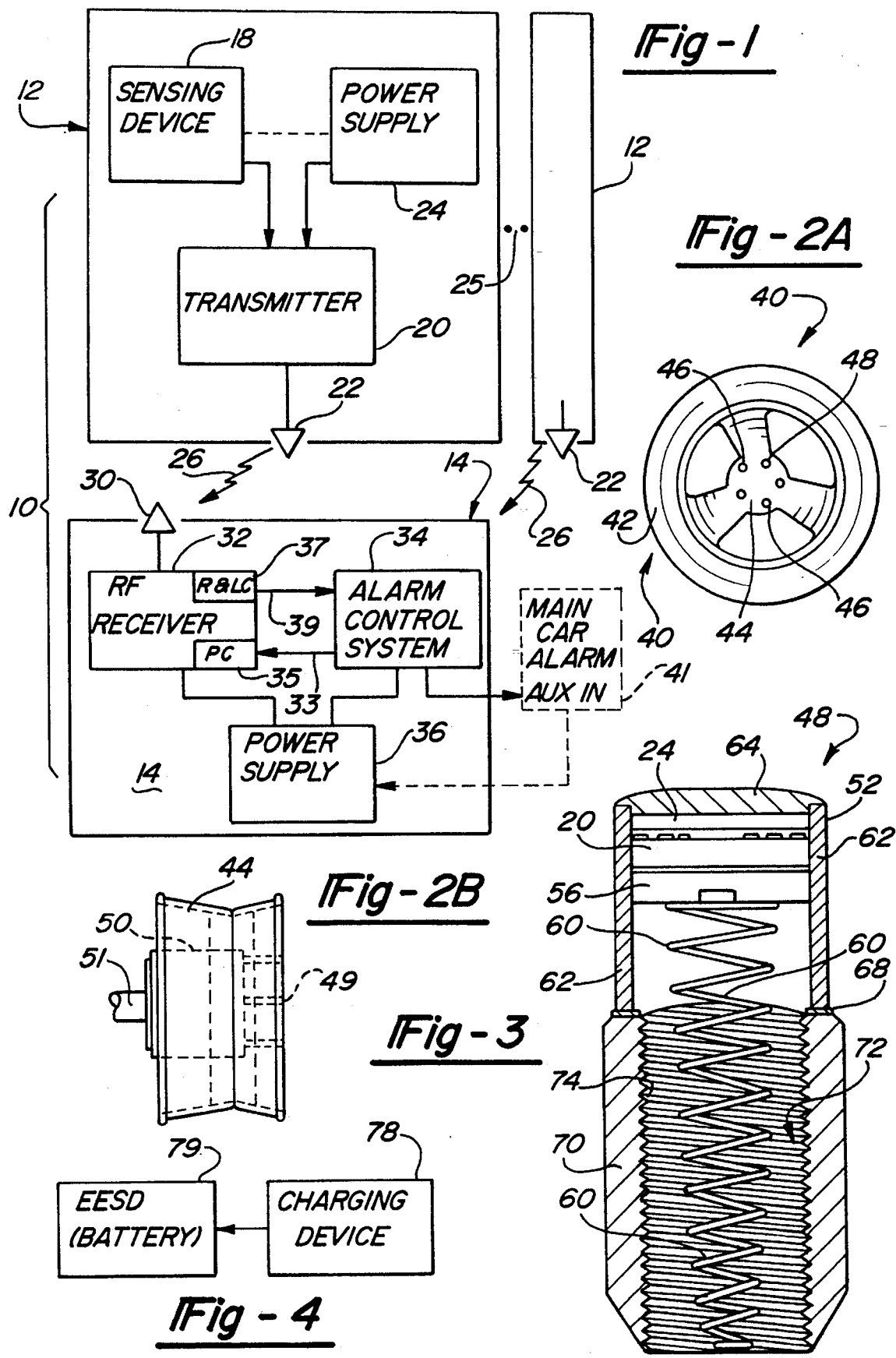

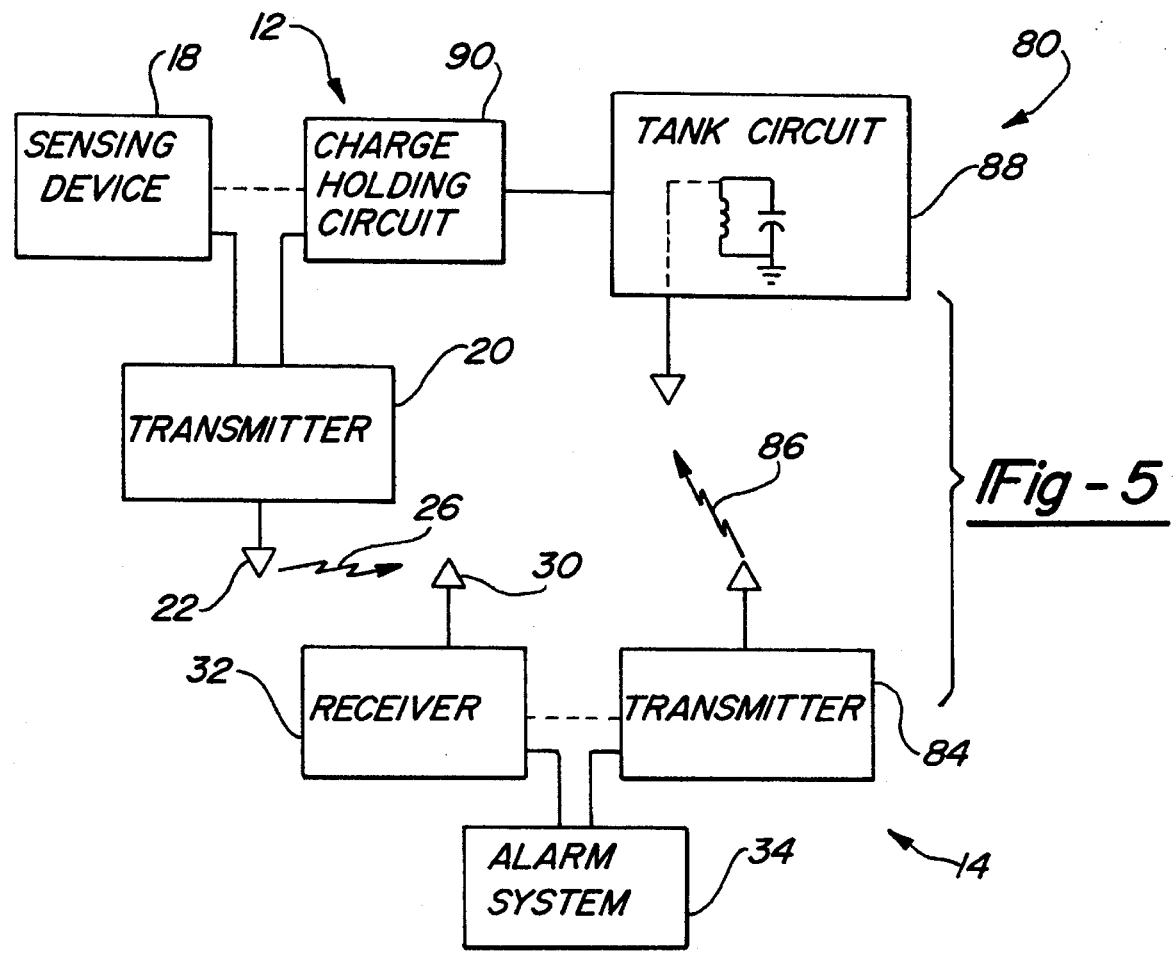
Fig-5
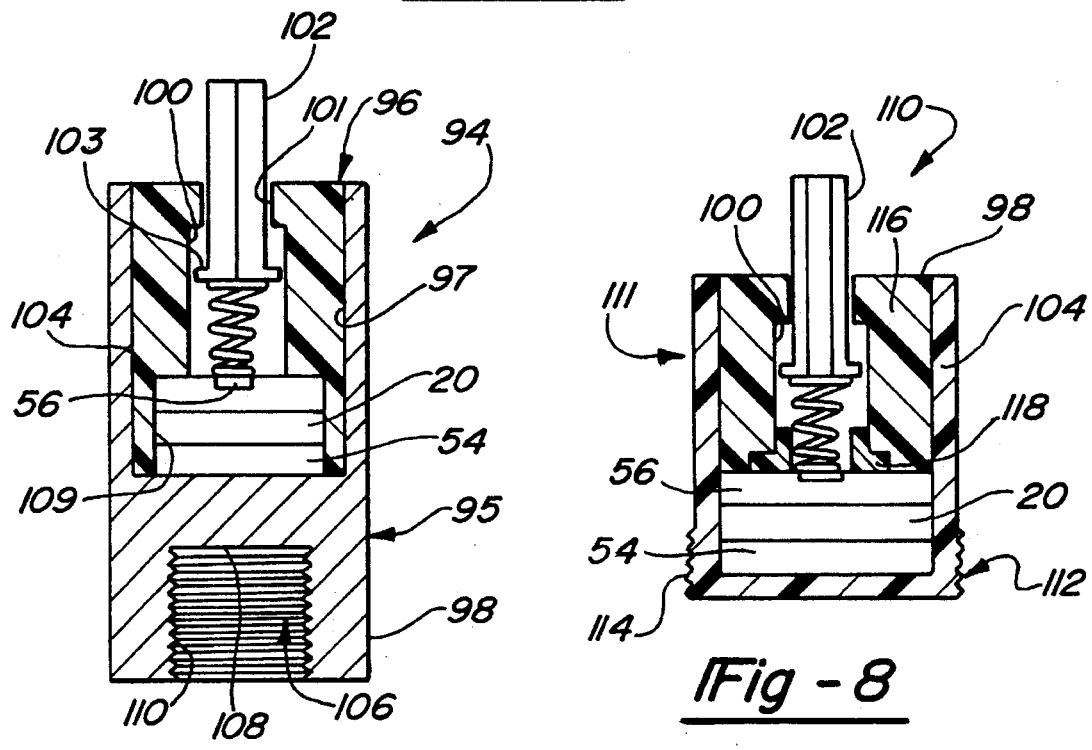
Fig-6
Fig-8

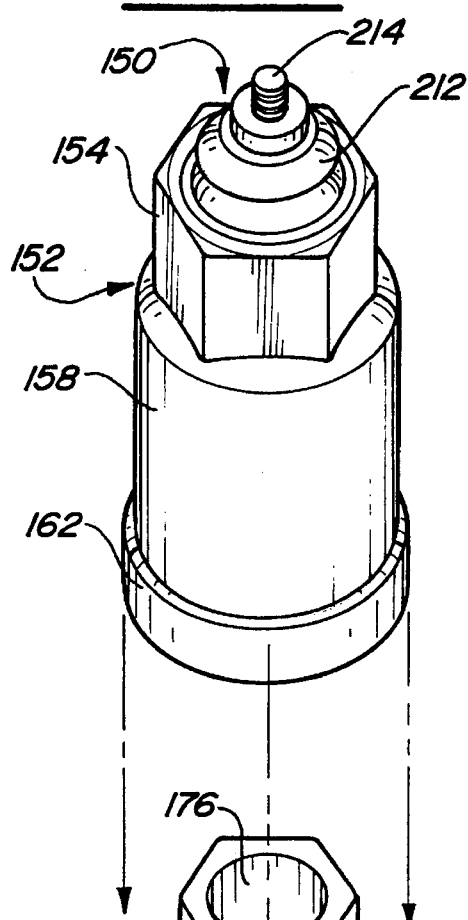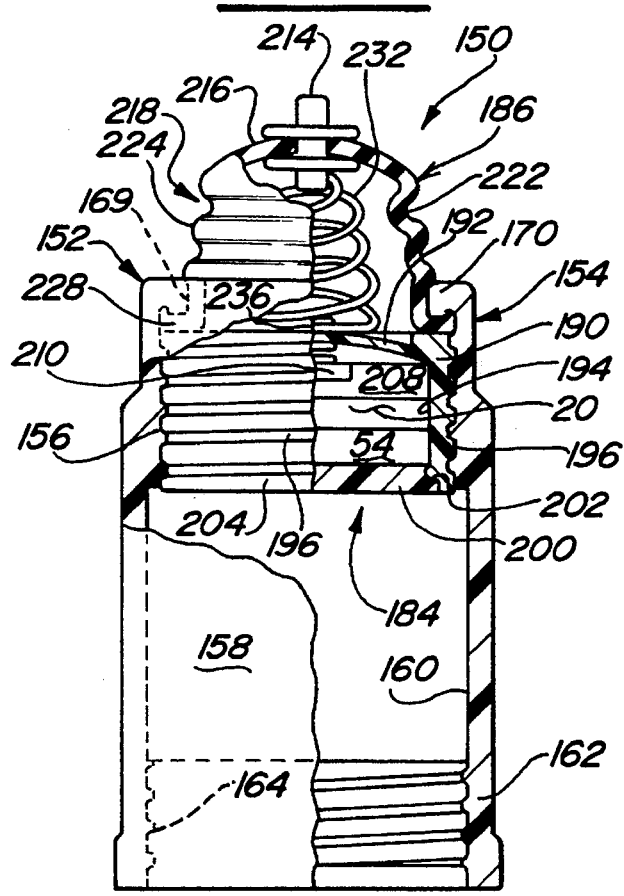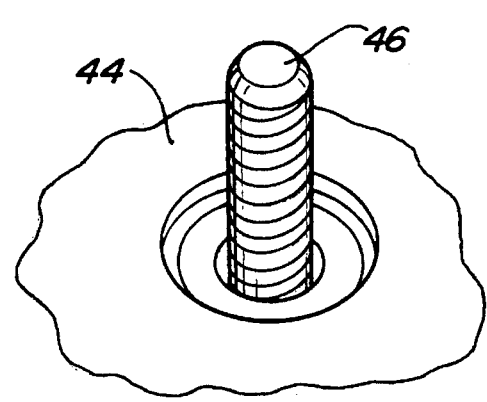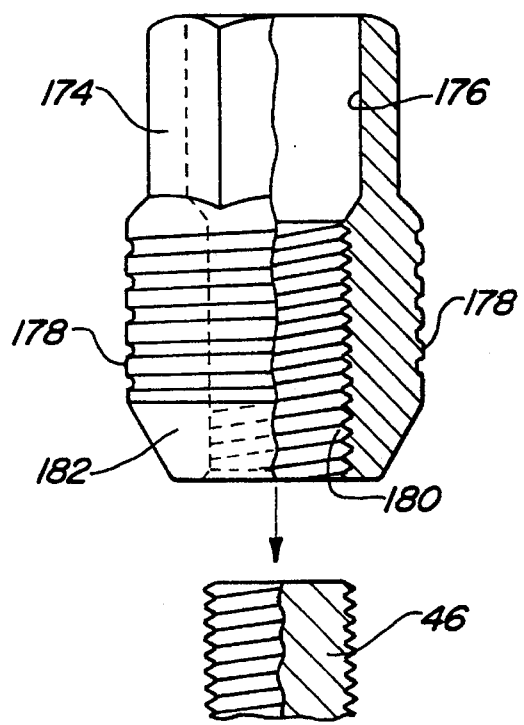

ELECTRONIC SYSTEM FOR DETECTING VEHICLE WHEEL THEFT

BACKGROUND OF THE INVENTION

1. Field of the Invention

This invention relates to alarm systems for automotive vehicles, and more particularly, to an electronic alarm system including a wheel-mounted sensing assembly that includes a radio frequency (RF) transmitter, for indicating the removal for theft or attempted theft of one or more wheel assemblies or wheel accessories of an automotive vehicle.

2. Discussion

Conventional vehicle alarms systems do not adequately protect against theft of a vehicle's wheel assembly or wheel accessory, such as a wheel cover. Some conventional alarm systems employ motion detecting alarms to detect tampering with a vehicle. The motion detecting sensors of these alarms are typically adjustable. False alarms typically result in the motion sensor being set to a less sensitive setting. However, these less sensitive settings may fail to detect careful removal of a wheel assembly and/or wheel accessory by a thief who does not jiggle the car. Even more sensitive motion detecting alarm systems may not detect more slight movement associated with the careful removal of one or more wheel covers.

Still other vehicle alarm systems merely disable the vehicle and sound an alarm when unauthorized use is detected. These systems typically do not include any protection of the vehicle's wheel assembly and/or wheel accessory. Therefore, a thief can simply remove the wheel assembly and/or wheel accessory without detection.

While conventional alarm systems typically have inputs for auxiliary sensors, several problems are associated with the use of sensors on the vehicle's wheel assembly and/or wheel accessory. Conventional sensing assemblies are typically easily detected by the thief and disabled. Further, since the wheel assembly and wheel accessory rotate, it is difficult to provide an electrical connection from a sensor mounted thereon to the auxiliary input.

Thus, a sensing assembly which detects the unauthorized removal or attempted theft of a vehicle's wheel assembly and/or wheel accessory without being readily detectable or easily disabled by the thief is desirable.

It is a primary object of the present invention to provide an electronic system for detecting the theft of vehicle wheels which includes a sensing assembly that is easy to install, and not visible or readily detectable and that is not easily disabled.

A related object of the present invention is to provide at least three versions or embodiments of a sensing assembly for a theft deterrent system for vehicle wheels, with each such sensing assembly being self-contained and employing an RF transmitter. The first version should have its own battery, so no external power is required. The second version should be internally rechargeable, so that it can be used indefinitely. The third should be externally rechargeable, so that it can be used indefinitely.

Another object is to provide an electronic alarm system for detecting vehicle wheel theft that can be implemented, positioned and attached in a variety of ways on a vehicle wheel, thus, making it possible to use the electronic system in connection with wheels having a variety of configurations.

Still another object of the present invention is to provide a relatively inexpensive, easy-to-manufacture sensing assembly that by its inherent design is rugged and reliable.

One more object is provide a sensing assembly which is compact, easily disguised and well-protected, thereby reducing the chances defeating it and/or detecting it.

Yet another object of the present invention is to provide an alternative sensing assembly which has no detectable output signal, except when actuated by an attempt to remove the vehicle wheel or a part thereof, such as a lug nut or wheel cover.

SUMMARY OF THE INVENTION

An electronic alarm system according to my invention detects unauthorized removal of at least one wheel item, such as wheel assembly or wheel accessory, from a vehicle. The alarm system uses a radio frequency (RF) alarm signal generated by a sensing device mounted on the wheel assembly or wheel accessory or between wheel components. My electronic alarm system includes a sensing device which has a secured state when the wheel assembly or the wheel accessory properly is installed on the vehicle, and which has an unsecured state when the wheel assembly or the wheel accessory is removed (or attempted to be removed) from the vehicle. The alarm system also includes an alarm transmitter capable of producing and broadcasting a low-power radio frequency (RF) alarm signal. The alarm transmitter is connected to and preferably located within the sensing device. The alarm transmitter is thus also effectively mounted to and supported by the wheel assembly and/or wheel accessory. The alarm transmitter behaves differently when the sensing device changes from its secured state to its unsecured state. The alarm transmitter alters a radio frequency (RF) alarm signal when the sensing device changes from its secured state to the unsecured state. Altering, in this sense, means to change the radio frequency by either initiating, terminating, or altering frequency in some manner. An RF receiver, located remotely from the alarm transmitter somewhere on or within the vehicle, receives the RF alarm signal and generates an alarm triggering signal when the alarm transmitter alters the RF alarm signal.

In one embodiment of my invention, the sensing device is part of a sensing assembly that includes a fastener for connecting the sensing assembly to a threaded wheel lug. The sensing assembly may be provided with a housing that is formed as part of, or is added as an end portion of, a lug nut so that it is hard to detect visually. Such a sensing assembly, whether formed as part of or an end portion addition to a lug nut, will typically include an internal cavity for housing the power source and electronics of the RF alarm transmitter.

Another feature of my invention is that the sensing device is a small, inexpensive device, mounted in the cavity of the housing of the sensing assembly. The sensing device may be a pressure switch, but it can also be a capacitance sensor or a solid-state proximity switch such as a Hall Effect sensor, an electromechanical microswitch, or any other suitable sensor structure.

According to another feature of the invention, a mechanical biasing means such as a helical spring is preferably located in the sensing assembly cavity. The spring biases the sensing device, which may be a pressure switch, into the secured state when the sensing assembly is fastened onto part of the wheel assembly, such as the wheel lug. As the sensing assembly is unfastened from the wheel assembly or wheel lug, and even before the sensing assembly is fully removed, the pressure switch or other sensing device changes from a secured state to an unsecured state.

According to another aspect of my invention, an electrical energy storage device (EESD), such as a battery, may be mounted within a cavity of the sensing assembly. The EESD can be rechargeable or nonrechargeable, as desired. If provided in a rechargeable form, the EESD can be recharged in at least two different ways. First, the EESD may be charged by an arrangement (such as a miniature electrical generator) for taking motion imparted to a movable part of the sensing assembly when the vehicle is in motion and converting it to electrical energy. Second, a tuned circuit such as a resonant tank circuit and a charge holding circuit, can be employed as part of the sensing assembly. In this arrangement, the tuned circuit receives an RF power signal generated by an external source and uses electrical energy derived therefrom to charge up the charge holding circuit or device.

The alarm system of my invention is also provided with alarm control means. My system may be turned on and off in response to commands received by the alarm control means. The alarm control means may include an appropriate operator or command interface. This interface may be implemented using conventional components such as a small illuminated keypad or an infrared or RF-based key fob. Alternatively, the interface may be configured to receive command signals originating with another electronic control unit, such as the main alarm system of the vehicle.

One of the advantages of my alarm system for detecting the unauthorized removal of vehicle wheels and/or wheel accessories is that is may be interconnected to the auxiliary input of a vehicle's main alarm system, and operated as a slave unit by the main alarm system. Preferably in this arrangement, whenever the main alarm system is activated by the owner of the vehicle, a command signal is received from the main vehicle alarm system which activates my alarm system. Further, when my alarm system detects unauthorized removal of a wheel or wheel accessory, my alarm control unit may relay this "sound the alarm" signal to the main vehicle alarm system through the auxiliary input. The main alarm system then will take appropriate action, such as sounding an alarm or vehicle horn, flashing the vehicle's head lights and brake lights, or the like.

Still other objects, features and advantages of my invention will be readily apparent to those skilled in the art after studying of the detailed description below in conjunction with the drawings and claims.

BRIEF DESCRIPTION OF THE DRAWINGS

In the drawings, where the same reference numerals in the different Figures refer to like components:

FIG. 1 is a schematic block diagram of a first electronic alarm system according to the present invention for detecting theft of a vehicle's wheel assembly or wheel accessory;

FIG. 2A is a front view of a wheel assembly including a tire, a wheel, and a plurality of lug nuts, one of which includes a sensing assembly according to the present invention;

FIG. 2B is a side view of a wheel hub, wheel lugs and an axle upon which wheel assembly of FIG. 2A is mounted;

FIG. 3 illustrates a side elevational view in a partial cross-section of a sensing assembly which includes a housing, a transmitter, a pressure switch, a spring and a battery;

FIG. 4 schematically illustrates one form of a rechargeable power supply for the sensing assembly in the FIG. 1 system, which power supply includes a rechargeable battery and a charging device which transforms motion into electrical energy;

FIG. 5 illustrates a schematic block diagram of a second electronic alarm system of the present invention for detecting vehicle wheel theft, which system includes a sensing assembly having a resonating tank circuit, a charge holding circuit, and an RF transmitter powered by and optionally located remotely from the resonating tank circuit and the charge holding circuit;

FIG. 6 illustrates a cross-sectional view of a first alternate sensing assembly which includes a fastener and a plunger which biases a spring into a pressure switch;

FIG. 8 is a cross-sectional view of a second alternate sensing assembly which includes a plunger and an alternate fastener;

FIGS. 10 through 12 all show a third alternate sensing assembly which includes a rubber diaphragm and is threadingly mounted within a wheel nut cover, wherein FIGS. 10 AND 11 respectively show the wheel nut cover, wheel nut and part of the wheel stud, ready for assembly, in a perspective view and a side elevational view in partial cross-section, and FIG. 12 shows the wheel nut cover, wheel nut and wheel stud assembled together in side elevational view, mostly in cross-section;

DETAILED DESCRIPTION

Figure 7:
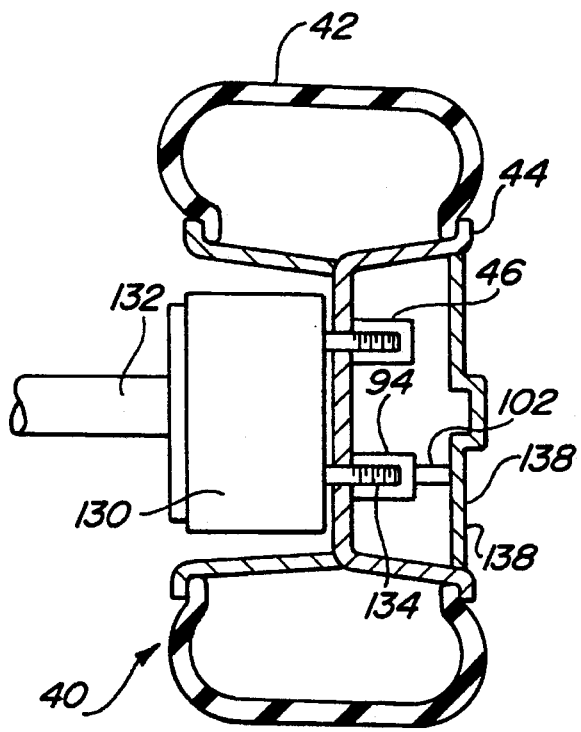
FIG. 7 illustrates an exemplary mounting location in a typical wheel assembly for the sensing assembly of FIG. 6.

In FIG. 1, a first embodiment of the present invention, namely an electronic alarm system 10 of my invention for detecting, and thus helping prevent, the theft of a vehicle's wheel assembly or wheel accessory, is shown in block diagram form. As used herein, "wheel assembly" refers to the wheel hub (also sometimes generally referred to as the wheel rim) and the tire. The term "wheel accessory" includes any of the components of a wheel assembly such as a wheel cover, wheel trim, a lug nut cover plate or any other part associated with a wheel assembly. Electronic alarm system 10 includes a sensing assembly 12 mounted on a vehicle wheel and a control assembly 14 located remotely from sensing assembly 12 such as on the underside of a vehicle, in the engine compartment of the vehicle, under the dashboard of the vehicle, or anywhere else on the vehicle. Sensing assembly 12 includes a sensing device 18 having a secured state and an unsecured state. Sensing device 18 is preferably in its secured state when a wheel assembly or a wheel accessory is properly fastened or installed while on a vehicle and in its unsecured state when the wheel assembly or wheel accessory is removed. Sensing device 18 preferably includes an electrical switch with a closed position and an open position which respectively correspond to the secured state and unsecured state of sensing device 18. Skilled artisans can appreciate that the electrical switch can also be configured so that the secured state of the sensing device corresponds to an open switch position and the unsecured state corresponds to a closed switch position. The switch in sensing device 18 may be a switch with one or more sets of electromechanical contacts or it may be a solid-state electronic switch. It may even be an optical switch which blocks or passes light, or which does not generate light or does generate light, as long as suitable connections between the optical switch and the transmitter 20 are provided. The sensing device 18 may be any sensor device suitable for detecting removal (or even movement) of the sensing assembly or a part thereof from (or relative to) the wheel assembly or a wheel accessory. Illustrative examples of sensing device 18 are discussed below.

Sensing device 18 is connected anywhere on the wheel assembly (but preferably not under the tire because that makes it difficult to install or replace), or on the wheel accessory or between the wheel assembly and a wheel accessory, or between two wheel accessories. Sensing assembly 12 further includes a RF transmitter 20, a transmitting antenna 22, and an electrical power supply 24. Sensing assembly 12 alters an RF alarm signal 26 to signify an alarm condition. Altering, in this sense, means to change the radio frequency by either initiating, terminating, or altering frequency in some manner. RF alarm signal 26 is altered when sensing device 18 makes a transition from the secured state to the unsecured state. RF alarm signal 26 can be a continuous wave signal or an intermittent RF signal. It preferably is at only one selected frequency. Further RF alarm signal 26 is preferably a coded signal employing a selected type of modulation (such as a pulse code modulation, frequency modulation or even amplitude modulation). But it can be any other suitable type of coded electronic signal, including a multi-frequency signal, if desired. The coded signal may be a six, eight, ten, twelve, sixteen (or more) bit code. As is well-known, with more bits of coded information, there is a reduced likelihood of accidental triggering of the alarm system by stray signals from other sources such as nearby like electronic alarm systems, but there typically is an increase in cost and complexity.

Control assembly 14, located remotely from sensing assembly 12, includes an antenna 30, an RF receiver 32, an alarm control system 34 and an electrical power supply 36, all electrically interconnected as shown. When alarm control system 34 is activated, it provides a power-on signal on lines 33 to power control (PC) section 35 of RF receiver 32. This activates receiver 32, which then will electronically listen for and await receipt of RF alarm signal 26 from sensing assembly 12. As described above, receiver 32 could also await termination or alteration of RF alarm signal 26, if the alarm signal 26 were set up to be broadcasted continuously in one form until there was an unauthorized removal of a wheel item. Recognition and logic circuitry (RLC) section 37 of receiver 32 decodes the incoming RF signal and checks to see if it matches the expected signal. When the RLC section of receiver 32 identifies initiation, alteration or termination of RF alarm signal 26. It generates an alarm triggering signal which is output on line 39 to an input of alarm control system 34. Antenna 30 and/or receiver 32 can be located near alarm system 34 or at other suitable positions within the vehicle. A position closer to transmitter 20, such as near a wheel well of the vehicle, may be more desirable, depending upon the range of transmitter 20.

FIG. 1 shows the details of a single sensing assembly 12, which is used to safeguard one wheel assembly. Those skilled in the art will appreciate that additional identical sensing assemblies can also be provided for each of the other wheels of a vehicle, including the spare wheel assembly if desired. This would be desirable for example where the spare wheel were mounted on the outside of the vehicle. This is depicted in FIG. 1 by the dots 25 which represent additional sensing assemblies 2 through N-1 (which are not shown), and by box 12' representing the Nth sensing assembly, and the antenna 22' representing the antenna for the Nth sensing assembly. Typically, the value of N would be 4 (or 5, if the spare wheel assembly were also protected by my alarm system) on conventional automobiles. For trucks, the value of N would vary with the number of wheels and spare wheels, so N could range from a value of 4 up to 12 or more.

More than one receiving antenna 30 may be provided if desired, such as somewhere near each wheel, or one in the front end of the vehicle and another near the rear end of the vehicle. Antenna 30 and receiver 32 are preferably constructed to be tuned to the frequency of RF signal 26. Receiver 32 also preferably employs suitable conventional circuits to help avoid false triggers due to spurious signals present in the vehicle's normal electromagnetic environment. Receiver 32 may be connected to an auxiliary sensor input of a conventional car alarm system 41. In such a case, the form and/or protocol of the alarm triggering signal would be dictated by the conventional car alarm chosen.

Transmitter 20, receiver 32 and alarm control system 34 are all preferably implemented using conventional rugged solid-state electronic circuitry of the type presently found on commercially-available keyless car-door entry systems, car alarm systems, and electronic garage door opener systems. Many of these kinds of systems use a coded RF signal from a hand-held key fob or remote transmitter to instruct a receiver system to respond in one or more desired ways. Each transmitter broadcasts a very low power RF signal, usually less than a tenth of a watt. Because the implementation and circuitry of such low-power coded RF signalling systems is well-understood by skilled artisans, the details of transmitter 20, receiver 32 and alarm system 34 need not be further described here, beyond noting the following. The transmitted power of the RF alarm signal 26 from the transmitter 20 will typically be several hundredths of a watt or less, and can even be in the milliwatt range or lower, since the alarm signal 26 need only be broadcast no further than in the immediate vicinity of the vehicle.

Referring to FIGS. 2 and 3, a first illustrative embodiment of sensing assembly 12 is shown in further detail. A wheel assembly 40 includes a tire 42, a wheel 44, a plurality of lug nuts 46, and at least one sensing assembly 48 which can take the form of a specially modified lug nut structure as shown. Wheel assembly 40 can further include wheel accessories such as a lug cover, a wheel cover, etc. Wheel assembly 40 is connected by internally threaded lug nuts 46 and sensing assembly 48 to a plurality of conventional externally-threaded wheel lugs 49 extending from wheel hub 50. Wheel assembly 40 and wheel hub 50 rotate in a conventional manner on an axle 51.

Sensing assembly 48 includes a generally cylindrical upper housing 52 which has a generally cylindrical internal cavity 54 for enclosing and protecting from the weather a power supply 24 (such as a battery or any other suitable power source), the transmitter 20, and the sensing device 18. Sensing device 18 can be, for example, a pressure switch 56 and a helical compression spring 56, which is shown in its relaxed or extended state. Alternately, sensing device 18 can include a capacitance sensor or any other suitable sensor or switch in place of pressure switch 56, that is capable of detecting a change of mechanical position of, or the electrical continuity, charge or conductivity of, or pressure or other force resulting from the movement, disassembly of or partial unfastening of wheel components and/or accessories. In the sensing assembly 48, the upper end 60 of spring 56 is positioned adjacent to and bears against and is attached to pressure switch 56. An upper cylindrical portion 62 and a cap portion 64 define the housing 52. Portions 62 and 64 can respectively be made from metal and plastic as shown, or each portion can be made of an electrically insulating material or can be made of metal and have selected portions of its interior wall covered with electrical insulation material. Upper cylindrical portion 62 is bonded and sealed to an annular ring 68 attached to a lower portion 70 which is preferably made of a high strength metal such as steel. Portion 70 has an external shape, such as a hexagonal cross-section, that allows a lug nut wrench to grip and turn it. Threaded inner surface 72 of lower cylindrical portion 70 threadedly engages male threads of lug 46 extending from wheel hub 50. Alternately, sensing assembly 48 can be made of plastic or other suitable materials, and can be made either integrally or of multiple cooperating pieces. Skilled artisans should appreciate that the external portions of lug nuts 48 and sensing assembly 48 are preferably designed to be close in appearance or even virtually indistinguishable from another, so that sensing assembly 48 is not easy to pick out.

Antenna 22 can be a metal strip or loop formed integrally within on a dielectric cap 64. Alternately, spring 60 which can be made to extend slightly from sensing assembly 48 upon removal of the lug, can be utilized as the antenna 22, by being electrically connected to the output of transmitter 20.

As suggested by the stacked configuration shown in FIG. 3, battery 54, transmitter 20 and switch 56 may be constructed as a subassembly which is sized to slip through threaded portion 72 of lug nut 48, where it can be bonded with epoxy or other suitable fasteners to remain in place. A suitable path through the solid-metal lug nut may be provided for connecting transmitter 20 to antenna 22, which can be mounted upon an insulated exterior surface of the lug nut, on either the upper cylindrical portion 62 or cap portion 64 of the lug nut 48.

In use, at least one sensing assembly 48 is employed for each wheel assembly 40. Preferably sensing assembly 48 has a close resemblance similar to the other standard lug nuts 46 to prevent visual detection of the sensing assembly. As sensing assembly 48 is rotated and secured on lug 50, spring 60 is compressed against pressure switch 56. When the force applied by spring 60 increases sufficiently, switch 56 changes states from its unsecured state to its secured state. Preferably, switch 56 makes a transition between the unsecured state and the secured state at a point after spring 60 has been partially compressed. In other words, pressure switch 56 preferably makes its transition between the secured and unsecured states approximately as sensing assembly lug nut 48 is threaded midway on lug 50.

Thereafter, when alarm system 34 is in an enabled state and a thief removes sensing assembly 48 in an attempt to steal wheel assembly 40, transmitter 20 alters RF alarm signal 26 when sensing device 18 makes the transition between the secured and unsecured states. Receiver 32 senses the alteration RF alarm signal 26 and generates the alarm triggering signal. Alarm system 34 receives the alarm triggering signal and activates an indicating means such as a siren, a horn, etc. Since all of the lug nuts 46 and sensing assembly 48 must be removed prior to removing wheel assembly 40 from wheel hub 50, a thief cannot steal wheel assembly 40 without triggering sensing assembly 48. As a result, theft of the vehicle's wheel assembly 40 is detected, an alarm is sounded, and hopefully completion of the act of theft is prevented by the thief running away immediately, rather than remaining at the crime scene, where he is more likely to be caught.

Referring to FIG. 4, power supply 24 can be a motion activated charging device 78 connected to a battery 79. Motion charging device 78 transforms motion, such as vibration or rotation of components, into electrical energy. Such devices are known and employed in self-winding watches and other miniature devices requiring a self-contained small electrical power source, and therefore need not be described further herein.

Referring to FIG. 5, an alternate alarm system 80 is shown. For purposes of clarity, reference numerals from FIGS. 1–4 are used on like components where appropriate. Alarm system 80 includes a small RF power transmitter 84 which transmits a RF power signal 86 preferably in the milliwatt to tenths of a watt range, which preferably is a continuous wave signal which oscillates at a selected frequency. Transmitter 84 transmits RF power signal 86 when alarm system 34 is activated or enabled. For example, alarm system 34 only need be activated when the vehicle is not being driven or operated. A tuned RF power-receiving circuit, such as a resonant tank circuit 88, associated with sensing assembly 12 obtains electrical energy from the broadcast RF power signal 86. Tank circuit 88 preferably includes inductive and capacitive components which are tuned to resonate at the selected frequency of the RF power signal 86. A charge holding circuit 90 coupled to tank circuit 88 through a diode or rectifier bridge circuit or like device stores the electrical energy generated by tank circuit 88 when tank circuit 88 is resonating due to power signal 86 of the alarm system 34 being activated or enabled. Tank circuit 88 and charge holding circuit 90 can be packaged in cavity 52. Thus, tank circuit 88 and charge holding circuit 90 provide a rechargeable power source for transmitter 20. Alarm system 80 is desirable since it can recharge charge holding circuit 90 periodically. Thus, a user need not worry that a power source (such as a battery) within the sensing assembly has become discharged over a period of weeks, months or years.

Alternatively, the alarm system 80 may be configured to operate power transmitter 84 only when the vehicle is operating, and/or only for short intervals of time when the vehicle is not operating, to avoid unnecessary drain upon the vehicle's main battery. RF power signal 86, when broadcast for a short period of time such as five seconds to sixty seconds, could provide sufficient power to resonant tank circuit 88 so that charge holding circuit 90 is able to be fully charged. Since charge holding circuit 90 preferably will not have any of its power drawn off until switch 18 detects an attempt to remove the wheel, the charge would remain in charge holding circuit 90 for quite some time, such as days, weeks or even months. In this manner, alarm system 80 would be normally electrically quiet, so that it would not be broadcasting signals, but would remain fully ready and able to do so for weeks (or longer) without being re-charged. In this manner, RF power signal 86 would only need to be broadcasted intermittently, at most, perhaps only once or several times per day or per week or per month, in order to maintain charge holding circuit 90 in a fully charged state. This very infrequent broadcast of RF power signal 86 would thus render alarm system 80 more difficult to detect, even by a sophisticated thief armed with appropriate RF receiving equipment.

Alternately, transmitter 20 could generate RF alarm signal 26 in a continuous manner until sensing device 18 makes a transition from the secured state to the unsecured state.

Transmitter 26 could then stop transmitting RF signal 26 or alter its RF alarm signal (e.g., a code change, frequency change, etc.). In response thereto, receiver 32 could then trigger alarm system 34 as previously described to indicate an attempted theft in progress.

FIG. 6 shows a first alternate sensing assembly 94 which is formed as a special wheel lug nut. Assembly 94 includes an exterior metal housing 95 and an interior plastic retaining member 96 which fits into complementary interior chamber 97 of housing 95. Retaining member 96 may be press-fit or glued into the interior chamber 97. Chamber 97 may have a cylindrical or hexagonal cross-sectional shape. Housing 95 may have a generally cylindrical exterior appearance or a hexagonal exterior appearance or a combination of the two appearances. For example, the bottom portion 98 of housing 95 may be cylindrical and the top portion 99 of housing 95 may be hexagonal.

Retaining member 96 has a centrally-located, generally cylindrical or hexagonal cavity with a co-axial enlarged bore portion 100 and a co-axial reduced diameter bore portion 101. Both bore portions have a cross-sectional area that is preferably hexagonal but may be cylindrical if desired. A plunger 102 moves within cavity portions 100 and 101 reciprocally between an extended position and a retracted position. Plunger 102 is kept in position radially and guided for axial-only movement by smaller bore portion 101 and the action of rim 103 of plunger 102 slidably contacting bore portion 100. Rim 103 slidably contacting the internal shoulder between the bore portions 100 and 101 serves to limit plunger travel in the extended direction. When bore portions 100 and/or 101 and plunger 102 have hexagonal cross-sections, any spinning of plunger 102 is avoided, which may help reduce any undesired rotational forces being exerted upon internal helical compression spring 104. Spring 104 is coaxial with plunger 102, and is pushed into pressure switch 56 with increasing force as plunger 102 moves from its extended position towards its retracted position. Housing 95 also includes within its lower end portion 98 a fastener connection portion 106. This portion 106 includes a axially-aligned bore 108 with female threads for receiving a threaded wheel stud or lug.

A cavity 109 is provided in the blind end of retaining member 96. It receives transmitter 20, battery 54, and the pressure switch 56, as shown. The outer rim of battery 56 may be sized to fit snugly within cavity 109. Those in the art will thus appreciate that retaining member 96 and all components mounted within it constitute a subassembly that may be separately handled without worry about it coming apart. Thus, this subassembly may be put together well in advance of being assembled into external housing 94. The axial and radial dimensions of housing 95 and its housing portions and/or the other components forming part of sensing assembly 94 may be varied as needed to accommodate the stud length and diameter and sensing assembly component sizes.

FIG. 8 shows a second alternate sensing assembly 110, which includes a generally cylindrical or hexagonally-shaped housing 111, which is shown to be made out of plastic material, but can also be made out of any suitable material including a metal casting. Housing 111 preferably has a generally cylindrical fastener end portion 112 with external threads 114 provided on the outer surface of housing end portion 112. These threads 114 may be used to attached and secure sensing assembly 110 to any complementary internally threaded socket that is provided on a wheel cap or cover, a wheel accessory, or within a metal or plastic threaded wheel nut cover (see example shown in FIGS. 10 through 12). Still other types of fastener means will be apparent to skilled artisans interested in removably and re-attachably connecting and securing a sensing assembly of the present invention to a wheel accessory or wheel cap or cover.

Sensing assembly 110 also includes an internal retaining member 116 that is very similar in appearance and function to retaining member 96. However, retaining member 116 includes an enlarged co-axial cylindrical pocket and lip area which receives an annular overload stop 118 with rim that has the appearance of a hat with a brim. The top of the stop 118 is open to receive spring 104. Overload stop 118 may be made out of metal or plastic. Stop 118 helps prevent the central mechanism of pressure switch 56, to which spring 104 is attached, from being overloaded. Further, the brim of the hat-like stop 118 helps more evenly distribute an overload forces from plunger 102 to pressure switch 56, to avoid overloading any one spot of pressure switch 56.

FIG. 7 shows an exemplary mounting position for first alternate sensing assembly 94. FIG. 7 is a cross-sectional view of wheel assembly 40 fastened to a wheel hub 130 which is mounted for rotation on an axle 132. Wheel hub 130 typically includes a plurality of threaded lugs 134 spaced circumferentially around and extending outwardly parallel to the axis of rotation of axle 132 and wheel hub 130. Fastener 106 of sensing assembly 94 is screwed onto one such lug 134. A wheel cover 138 is then installed on wheel assembly 40 in a conventional manner. As illustrated in FIG. 6B, wheel cover 138 pushes plunger 102 against bias spring 104 which in turn presses against sensing device 18 with sufficient force to put the switch in device 18 into its secured state. As wheel cover 138 is removed, plunger 102 moves on account of spring 104 toward its extended position and sensing device makes the transition from the secured state to the unsecured state.

Figure 9A:
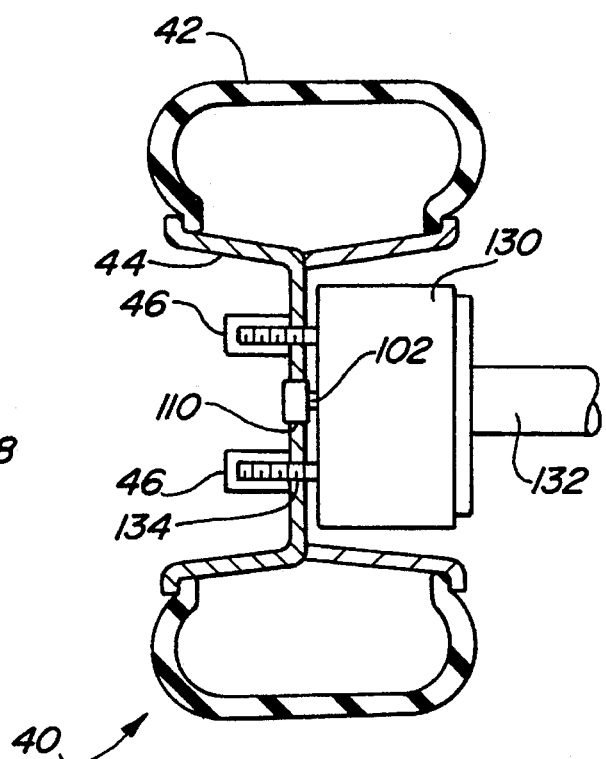
FIGS. 9A through 9C illustrate exemplary mounting locations in a typical wheel assembly for the sensing assembly illustrated in FIG. 8.
Figure 9B:
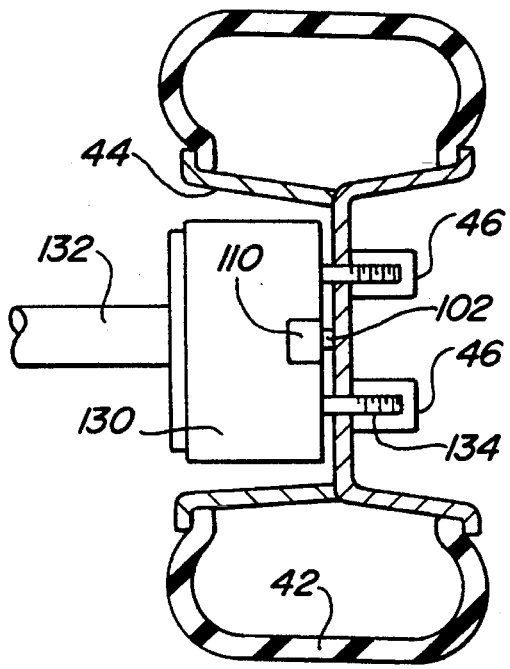
Figure 9C:
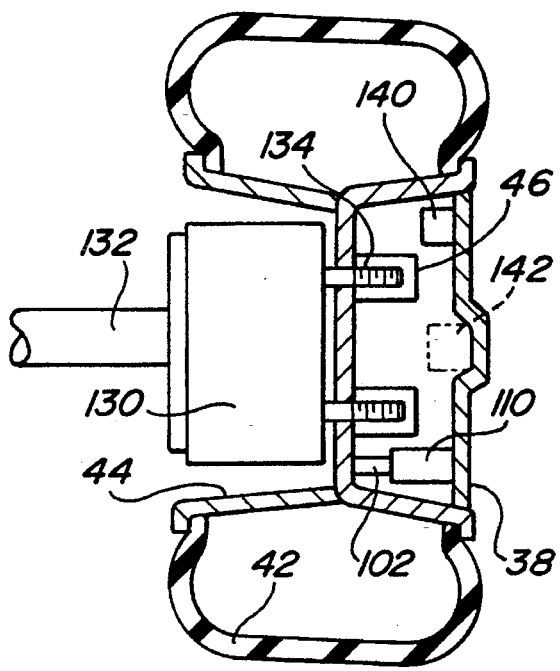

Referring to FIGS. 9A through 9C, exemplary mounting positions for the second alternate sensing assembly 110 are illustrated. In FIG. 9A, sensing assembly 110 is coaxially mounted on wheel 44, and wheel hub 130 pushes plunger 102 toward spring 104, which bears against sensing device 18. Referring to FIG. 9B, sensing assembly 110 is mounted on wheel hub 130 such that wheel 44 pushes plunger 102 into bias spring 104, which bears against sensing device 18. In FIGS. 9A and 9B, removal of wheel assembly 40 allows spring 104 to move plunger 102 to its fully extended position. As a result, sensing device 18 makes a transition from the secured state to the unsecured state.

Referring to FIG. 9C, second alternate sensing assembly 110 is mounted on wheel cover 138 such that wheel 44 pushes plunger 102 into bias spring 104 to actuate sensing device 18. A counterweight 140 may be provided for dynamic wheel balance, if needed due to the second alternate sensing assembly 110 being mounted a distance from a center of rotation of wheel cover 138 and being sufficiently heavy to produce any discernable wheel imbalance. Alternately, sensing assembly 110 can be mounted at the center of rotation indicated by dotted lines 142 and FIG. 7D. Removal of wheel cover 138 allows plunger 102 to extend into the fully extended position. As a result, sensing device 18 makes its transition from the secured state to the unsecured state.

FIGS. 6 through 13 have shown various mounting positions for the sensing assemblies. In every instance, it is a relatively simple matter to access the sensing assembly, and there is never a need to remove the tire from the wheel hub to do so. Still other mounting positions for the sensing assembly between the wheel and a wheel accessory will be readily apparent.

Figure 12:
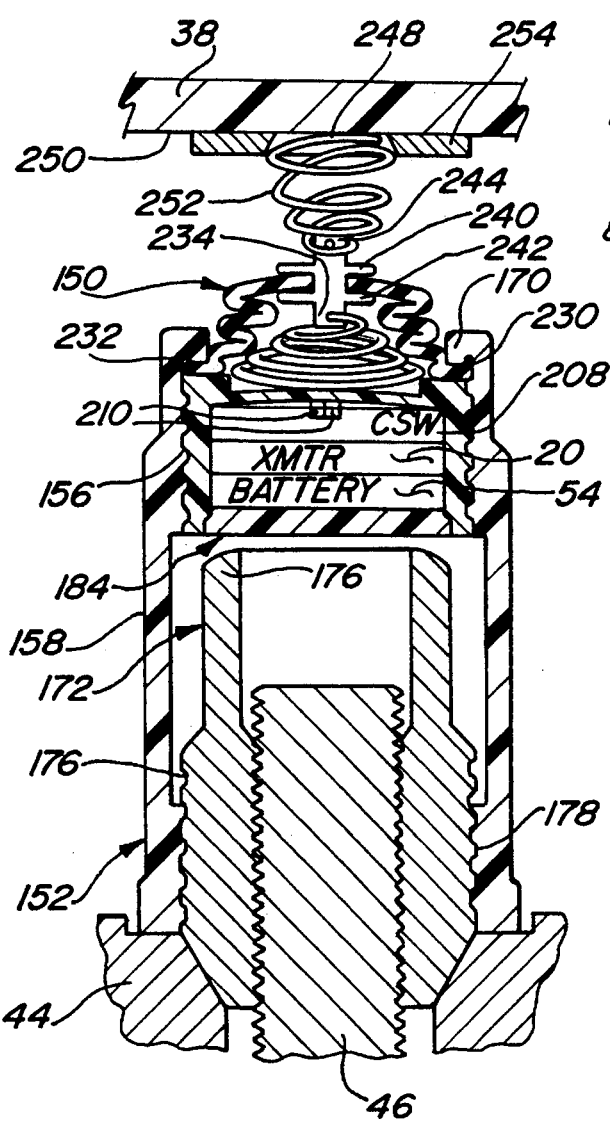

FIGS. 10 through 12 show a third alternate sensing assembly 150 mounted in a specially designed hollow wheel nut cover 152. Cover 152 has a generally hexagonal top portion 154 with a threaded internal side wall 156 (see FIG. 11), a generally cylindrical central portion 158 with a generally cylindrical bore 160, and a generally cylindrical lower portion 162 with internal threads 164. The lower open end 166 of wheel nut cover 152 fits over a conventional wheel nut 172 which screws onto a conventional wheel lug 46 mounted in the wheel hub 44. The upper end 168 of cover 152 has a circular opening 169 rimmed by inner annular flange 170.

Wheel nut 172 has a generally hexagonal top portion 174 with a straight coaxial bore 176, a generally cylindrical center section 178 with an internal threaded coaxial bore 180, and a lower portion 182 resembling a truncated cone, through which bore 180 also passes.

FIG. 12 shows wheel nut cover 152 and wheel nut 172 assembled onto the threaded wheel stud 46 and tightened down against wheel hub 44. As best shown in FIG. 12, the lower internal threads 164 of nut cover 152 are engaged in the male threads 178 of the wheel nut central portion 176.

The top of FIG. 11 shows that the sensing assembly 150 includes a lower section 184 internal to the nut cover 152 and an upper section 186 external to cover 152. The internal section 184 includes a plastic cup-like member 190 having an integral semi-flexible domed plastic top portion 192. Cup 190 has a cylindrical chamber 194 and an external generally cylindrical threaded surface 196 that screws into threads 156 of hexagonal top portion 154 of cover 152. Section 184 also includes a generally flat plastic end cap 200 having a threaded edge 202, which screws into the lowermost threaded part 204 of cup 190.

Within chamber 194 of internal housing 190 is mounted a battery 54, a transmitter 20 and a capacitance-operated switch 208 with associated electronics and sensing plate 210. (The design for a capacitance switch 208 and its associated operational circuitry are well-known, since such switches are in common use on many types of electronic devices, such as elevator controls and keyboards for portable devices. Thus, the details of switch 208 and its associated circuitry need not be further discussed here).

The top portion 186 of assembly 150 includes a fairly stiff, but axially-flexible and compressible protective boot 212, which extends through the top circular opening 169 of hexagonal portion 154 of wheel nut cover 152. Boot 212 can be made out of any conventional flexible material such as neoprene, high-density polyethylene or other suitable plastic material. A hard preferably plastic grommet structure 214 protrudes through the top portion 216 of boot 212. The central section 218 of boot 212 is preferably corrugated, as shown, with a series of alternating interconnected trough and crest sections 222 and 224, to enhance grommet flexibility and length of travel in the axial direction. The lowermost portion 228 of boot 212 includes an enlarged rim which preferably has an annular bead of material 230 sized to fit within an annular groove 232 of the top portion 154 of the cover 152 (as best seen in FIG. 12).

The top section 186 of sensing assembly 150 also includes a helical coiled compression spring 232 which extends between the cylindrical inner projection 234 of grommet 214 to the centrally located cylindrical outer projection 236 of semi-flexible wall portion 192 of inner housing 190. The projections 234 and 236 serve as mounting and/or centering studs for spring 232, and they may be provided with radially arranged through holes or slots if desired for receiving adjacent end portions of spring 232. Alternatively, the spring 232 may be formed with its end portions each coiled into a loop which snugly engages the cylindrical side wall surfaces of projections 234 and 236. The purpose of so interconnecting the spring ends with the projections is to help ensure that the spring is not free to knock about in any radial direction when the sensing assembly 150 is mounted on a wheel of a moving car. In this regard, the gauge of the wire out of which spring 232 is made, and the thickness and durometer rating of the flexible material out of which boot 212 is made are both preferably sufficiently stiff to avoid undesirable radial wobble during use of the sensing assembly on a rapidly rotating wheel of an automotive vehicle.

As shown in FIGS. 11 and 12, grommet structure 214 preferably has two spaced cylindrical flange portions 240 and 242 which snugly engage the top portion 216 of boot 212. Grommet structure 214 also preferably includes a coaxial exterior projection 244 upon which extension members may be mounted if needed or desired. One such extension member is the helical compression spring 252 shown in FIG. 12. One end portion of spring 252 engages the exterior projection 244, while the other end portion 248 of spring 252 engages the inside surface 250 of the wheel cap 38 shown at the top of FIG. 12. An optional bowl-like structure 254, which may be the hole 256 in an annular metal washer, provides a pocket which receives the end portion 248 of spring 252. Washer 254 may be adhesively bonded to the wheel cover surface 250, or the wheel cover 38 may be integrally formed with a bowl structure 254 and/or spring-receiving hole 256 already in it.

An advantage provided by the construction of the internal section 184 of sensing assembly 150 is that the top end is sealed with respect to the opening 169, since the cap 200 is located on the opposite end of cup 196. Furthermore, the rim 228 of boot 212 is compressed by the upper annular edge of cup 190, when this threaded cup is sufficiently tightened into wheel nut cover 152. This rim 228 abuts the upper lip 170 and thus provides a seal against entry of water or other contaminants.

FIGS. 11 and 12 illustrate how the semi-flexible wall portion 192 operates. The sensing assembly 150 is in its unsecured state when in the state shown in FIG. 11, and in its secured state when in the state shown in FIG. 12. When as shown in FIG. 11, the outermost end of the sensing assembly 150, namely structure 214, is not in contact with an installed wheel accessory, such as wheel cover 38, the boot 212 and spring 232 are in their fully extended position. The force transmitted by partially compressed spring 232 in this condition is not strong enough to overcome the naturally-formed stresses in wall portion 192 which cause it to bulge axially outwardly as shown in FIG. 11. Consequently, the inside metal plate 193 centrally attached to wall portion 192 is lifted up and spaced away from the insulated parallel plates 210 on the capacitance switch 208. (Although not shown, an electrical insulator, such as a film coating, may be provided on top of and between these two plates 210, and/or on the adjacent surface of metal plate 193.)

FIG. 12 shows that when a force is exerted, such as through compression spring 252, against grommet 214, so as to compress internal spring 212 sufficiently, the semi-flexible wall portion 192 will bend inwardly, thus bringing the parallel plates 193 and 210 in close proximity to one another. This in turn changes the capacitance of the combined set of parallel plates 193 and 210, and thus changes the state of capacitance switch 208.

Figure 13:
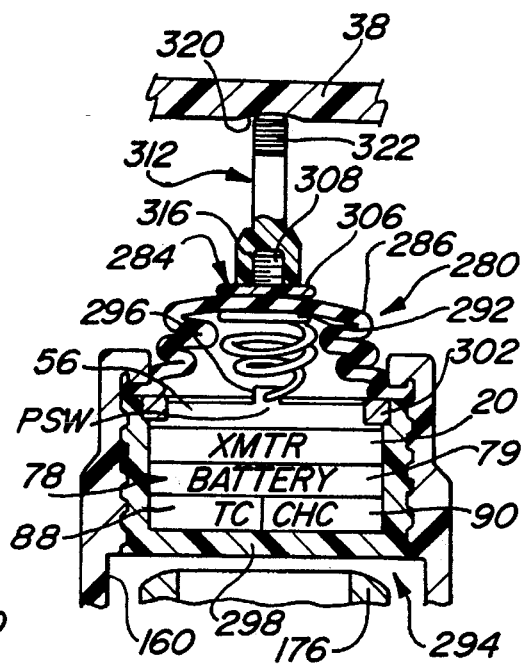
FIG. 13 is a side cross-sectional view of a fourth alternate sensing assembly of the present invention which also includes a rubber diaphragm, and is also mounted with a wheel nut cover, but which opens on a side opposite that of the FIG. 11 sensing assembly.

FIG. 13 shows a fourth embodiment 280 of the sensing assembly of the present invention. It is constructed very much like sensing assembly 150 illustrated in FIGS. 11 and 12. Thus, only the differences between these two sensing assemblies will be described. In place of capacitance switch 208, the pressure switch 56 is provided. The top of protective flexible boot 282 is not penetrated by any hole or object. Instead, the top protrusion structure 284 is bonded by adhesives or thermal techniques to the top portion 286 of protective boot 282. In this way, there is no passage in the boot through which water or other contaminants may enter.

The coiled helical compression spring 290 within the protective boot 282 may be oriented so and sized that its large end portion 292 fits snugly within the top portion 286 of the boot 282. The other end portion of spring 290 is mechanically linked to the protruding stud 296 of pressure switch 56. In this manner, spring 290 is prevented from wobbling in a radial direction when the sensing assembly 280 is in use on a motor vehicle.

The internal section 294 of sensing assembly 280 has its cup structure 296 closed along bottom wall portion 298, and open at the top end where pressure switch 56 is located. The closed bottom 298 of cup 296 prevents water or moisture coming from the direction of the stud 46 from reaching the electronic components. An annular metal washer 302 is provided to hold the lower section 294 together prior to its installation into wheel nut cover 152. As shown in FIG. 13, the upper flat surface of washer 302 engages the lower annular rim of the boot 282. When the washer 302 is tightened up against the lower rim of boot 282, a weather-tight seal is formed, thus protecting the electronic components of sensing assembly 280 from adverse weather, environmental conditions, including moisture. If desired, the lower rim of the boot 282 may be adhesively bonded to the washer 302 and/or upper edge of the cup to form a hermetically sealed container for all components within. This helps protect the components against the effects of moisture, salt spray, brake dust, rust or other possible automotive environment contaminants like grease and oil.

FIG. 13 also illustrates that the structure 284 at the top of the protective boot 280 is coaxially arranged with respect to the wheel nut cover 152. Structure 284 includes a flange portion 306 and a projecting coaxial stud portion 308. If needed, an extension member 312 may be screwed onto the stud 308 to reach the wheel cover or cap 38. The extension member 312 has an elongated shaft portion 314 connected to a coaxial connector portion 316 formed with internal threads. Cup portion 316 is screwed onto stud 308, and tightened down against flange 306. The wheel cover 38 may be formed with a suitable cylindrical hole or shallow tapered basin 320 to receive the distal end of stud 31 4 if desired or necessary to prevent the member 314 from wobbling. Alternatively, the threaded distal end 322 of member 312 may be screwed into a corresponding threaded sockets (not shown) provided in or on the wheel cover 38.

The sensing assembly 280 may include within its internal section 294, the following electrical and electronic components: a transmitter 20 (including a small loop antenna, not shown), a battery 79, and an optional battery charging section 78. Section 78 includes a loop antenna (not shown) connected to a tank circuit 88, and a charge holding circuit 90 which trickle-charges the battery 79 when a suitable RF power signal 86 is received. In section 294, the battery is preferably a rechargeable battery that has an extremely long shelf life, and holds an electrical charge for a long time. The battery 79 is preferably installed fully charged. Such a battery can be recharged as necessary from a remote location by use of a suitable nearby RF amplifier which generates the power signal 86. The battery 79 can thus be recharged without needing to remove internal section 294 from the wheel nut cover in which it is installed.

Figure 14:
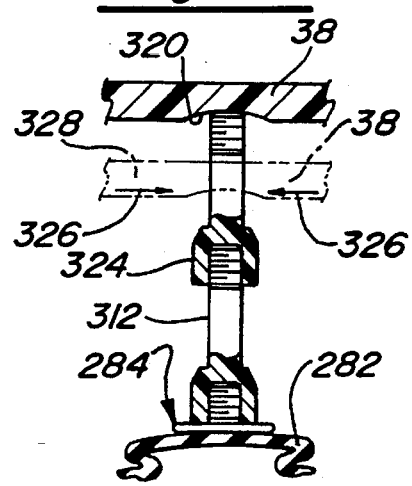
FIG. 14 is a side cross-sectional view of a user-changeable extension member for the third and fourth alternate sensing assemblies of the present invention.

FIG. 14 shows that two identical extension members 312 and 324 may be screwed together to provide a longer coaxial extension if desired. One advantage of making the extension members 312 and 324 out of plastic material as shown is that the extension members may be trimmed to length by simply sawing or cutting the extension member as required to accommodate the distance between the projection 284 and the inside surface of wheel cover 38. For example, if the wheel cover 38 were normally somewhat closer to the structure 284, as illustrated by phantom lines 328 in FIG. 14, then the second extension member 324 could be cut to length where indicated by arrows 326. In this manner, non-standard spacings between the wheel cover (or other wheel accessory) and the tip 284 of sensing assembly 280 may be readily accommodated. Those in the art will appreciate that other styles of extension members and/or interconnections between extension members and the external projection 284 may be employed.

As can be appreciated from the foregoing, the electronic alarm system according to the present invention provides an effective means for detecting the attempted theft of a vehicle's wheel, wheel accessories and/or wheel assemblies. Further, the electronic system of the present invention, including the sensing assemblies, may be constructed using mass-production techniques at a relatively modest cost. Note that many of the sensing assemblies disclosed herein include one or more subassemblies that can be constructed in advance of being used in the sensing assembly. This facilitates mass-producing the sensing assemblies, and also makes them easier to repair, either at the factory or at an auto dealership or at an alarm installation shop. Further, the use of such subassemblies renders it possible for a qualified service technician to readily perform repairs in the field, by simply removing and replacing a subassembly suspected of being defective.

The receiver and alarm control system portion of my electronic alarm system can be easily incorporated into conventional car alarm systems, which will help keep the cost of an installed wheel protection system of the present invention at very reasonable levels. Another advantage of my invention is that installation of the sensing assembly on a threaded lug or at other desired locations of a wheel assembly and/or accessory can be performed by skilled or unskilled persons in an aftermarket environment. Because various locations for the sensing assembly that are described above can be utilized, the shape of the sensing assembly can take almost any convenient desired form. Thus, automotive companies and/or manufacturers of auto aftermarket alarm systems will be able to place my sensing assembly in the most cost-effective and desirable position, depending on the style of wheel or wheel accessory (such as decorative wheel cover) for any particular vehicle.

Based upon the foregoing description skilled artisans should appreciate that the preferred embodiments of the present invention are well suited to achieve the objects and produce advantages of my invention that are stated above. Still other advantages and modifications of the present invention will become apparent to one skilled in the art upon further reflection of the foregoing specification and following claims. For example, the sensing device 18 may be constructed so as to not require a helical compression spring. For example, a small microswitch or an all solid-state magnetically generated proximity switch or capacitance switch may detect directly the presence or absence of the lug or other wheel item within or adjacent to the switch. In the light of the foregoing comments, it is to be understood that the present invention is not to be limited to the specific embodiments described and illustrated herein, but should be deemed to extend to the subject matter defined by the appended claims including all fair equivalents thereof.

I claim:

1. An alarm system for detecting unauthorized removal from a vehicle of a wheel item such as a wheel hub, a wheel assembly and a wheel accessory, the alarm system comprising:

a sensing device having a secured state when the wheel item is installed on the vehicle, and an unsecured state when the wheel item is removed from the vehicle;

alarm transmitting means, connected to the sensing device, for initiating a radio frequency (RF) alarm signal when the sensor changes from the secured state to the unsecured state; and receiving means, located remotely from the alarm transmitting means, for generating an alarm triggering signal when the alarm transmitting means initiates the RF alarm signal.

2. The alarm system of claim 1 wherein the alarm transmitting means includes:

fastening means for attaching the alarm transmitting means and the sensing device to a wheel item.

3. The alarm system of claim 1 further comprising:

a sensing assembly which includes the sensing device, a fastening means for connecting the sensing assembly to a wheel lug, and a housing having a cavity for substantially enclosing the alarm transmitting means.

4. The alarm system of claim 3 wherein the sensing device includes a pressure switch mounted in the cavity.

5. The alarm system of claim 4 further comprising:

spring means located in the sensing assembly cavity for biasing the pressure switch into the secured state when the sensing assembly is fastened on the wheel lug.

6. The alarm system of claim 5 wherein, as the sensing assembly is unfastened from the wheel lug and before the sensing assembly is fully removed from the wheel lug, the pressure switch changes from the secured state to the unsecured state.

7. The alarm system of claim 5 further comprising:

a power supply mounted at least substantially within the housing.

8. The alarm system of claim 7 wherein the power supply substantially within the housing includes a self-contained electrical energy producing device.

9. The alarm system of claim 8 wherein the electrical energy producing device includes a battery.

10. The alarm system of claim 9, further comprising:

charging means, mounted at least substantially within the housing the sensing assembly, for transforming mechanical motion into electrical energy for charging the battery.

11. The alarm system of claim 1 further comprising:

alarm control means, connected to the receiving means, for indicating an alarm condition in response to the alarm triggering signal.

12. The alarm system of claim 11 further comprising:

power transmitting means for transmitting a RF power signal;

tuned circuit means, located remotely from the power transmitting means and tuned to a frequency of the RF power signal, for receiving the RF power signal and for generating electrical energy in response thereto; and charge holding means, coupled to the tuned circuit means and the alarm transmitting means, for storing the generated electrical energy for powering the alarm transmitting means.

13. The alarm system of claim 12 wherein the power transmitting means is coupled to the alarm control means, and wherein the alarm control means selectively activates the power transmitting means only when the alarm control means is enabled.

14. The alarm system of claim 1 further comprising:

a housing for the alarm transmitting means, the housing including fastening means for fastening the housing to a wheel item.

15. The alarm system of claim 14 wherein the sensing device further comprises:

a pressure sensor which has the secured state and the unsecured state;

a reciprocating plunger having and movable between an extended position and a retracted position; and spring means located between the reciprocating plunger and the pressure switch, for normally biasing the reciprocating plunger toward its extended position, and wherein the pressure switch is in the unsecured state when the reciprocating plunger is in the extended position, and the spring means biases the pressure switch into the secured state at a transition point where the plunger is between the extended position and the retracted position.

16. The alarm system of claim 15 wherein the plunger includes an annular flange and the housing defines first and second stop surfaces, wherein the pressure is in the secured state when the annular flange abuts the first stop surface, and wherein the sensor is in the unsecured state when the annular flange abuts the second stop surface.

17. The alarm system of claim 15 wherein the fastening means fastens the housing to the wheel and wherein the wheel cover biases the plunger towards the retracted position when the wheel cover is installed on the wheel.

18. The alarm system of claim 15 wherein the fastening means fastens the housing to the wheel cover and wherein the wheel biases the plunger towards the retracted position when the wheel cover is installed on the wheel.

19. The alarm system of claim 15 wherein the fastening means fastens the housing to the wheel hub and wherein the wheel biases the plunger towards the retracted position when the wheel is installed on the wheel hub.

20. The alarm system of claim 15 wherein the fastening means fastens the housing to the wheel and wherein the wheel hub biases the plunger towards the retracted position when the wheel is installed on the wheel hub.

21. A sensing assembly, for use in a wheel alarm system for an automotive vehicle, for helping detect removal of a wheel item such as a wheel, a wheel hub and a wheel accessory, the sensing assembly comprising:

a housing including an internal cavity;

fastening means for fastening the housing to at least one wheel item;

a sensor, positioned at least substantially within the cavity, having a secured state when the selected wheel item is properly installed on the vehicle, and an unsecured state when the selected wheel item is removed from the vehicle; and alarm transmitting means, connected to the sensor, for initiating a radio frequency (RF) alarm signal when the sensor changes from the secured state to the unsecured state.

22. A sensing assembly, associated with a vehicle alarm system, for sensing removal of a wheel assembly or wheel accessory, the sensing assembly comprising:

a housing including a cavity having an opening for receiving a wheel lug;

threads defined by the housing in the cavity for fastening the housing to the wheel lug;

a spring located in the housing;

a sensor, positioned in the cavity between the opening and the spring, having a secured state and an unsecured state; and alarm transmitting means, connected to the sensor and located in the cavity, for generating a radio frequency (RF) alarm signal when the sensor changes from the secured state to the unsecured state.

23. The sensing assembly of claim 22 further comprising a wheel nut attaching to the wheel lug, and the wheel nut has outer threads which cooperate with the threads of the housing to provide an intermediate attachment of the sensing assembly to the wheel lug.

24. The sensing assembly of claim 23 wherein the sensing device further comprises:

a reciprocating plunger having and movable between an extended position and a retracted position, the spring means located between the reciprocating plunger and the sensor, for normally biasing the reciprocating plunger toward its extended position, and wherein the sensor is in one of the unsecured state or the secured state when the reciprocating plunger is in the extended position, and the sensor is in the other state when the reciprocating plunger is in the retracted position.

25. The sensing assembly of claim 24 wherein the plunger extends exteriorly to the housing and the wheel cover biases the plunger toward the retracted position when the wheel cover is installed on the wheel.

26. The sensing assembly of claim 24 wherein the plunger extends interiorly to the housing and is in a retracted position when the housing attaches to the lug and is in an extended position when the housing is removed from the lug.

27. An alarm system for detecting unauthorized removal of at least one of a wheel assembly and a wheel accessory of a vehicle, comprising:

a power supply;

a sensor having a secured state when the at least one of the wheel assembly and the wheel accessory are installed on the vehicle, and an unsecured state when the at least one of the wheel assembly and the wheel accessory are removed from the vehicle;

alarm transmitting means, connected to the sensor and the power supply for initiating a radio frequency (RF) alarm signal when the sensor changes from the secured state to the unsecured state;

resonant circuit means tuned to a frequency of a RF power signal for receiving the RF power signal and for generating a charge in response thereto; and charge holding means, coupled to the resonant circuit means and the power supply for charging the power supply;

power transmitting means, located remote from the alarm transmitting means and the sensor, for generating the RF power signal; and receiving means, located remote from the alarm transmitting means, the resonant circuit means and the charge holding means, for generating an alarm triggering signal when the alarm transmitting means initiates the RF signal.

28. An RF-based alarm system for detecting unauthorized removal of a wheel item such as a wheel assembly or a wheel accessory from a vehicle, comprising:

a sensor having a secured state when the wheel item is installed on the vehicle, and an unsecured state when the wheel item is removed from the vehicle;

alarm transmitting means, connected to the sensor, for causing a radio frequency (RF) alarm signal to behave differently when the sensor changes from the secured state to the unsecured state;

an electrical energy storage means, coupled to the alarm transmitting means, for powering the alarm transmitting means;

motion charging means, coupled to the electrical energy storage means, for transforming at least a portion of motion into electrical energy for charging the battery; and receiving means, located remote from the alarm transmitting means, the sensor, the motion charging means, and the battery, for generating an alarm triggering signal when the alarm transmitting means initiates the RF alarm signal.

29. An alarm system for detecting unauthorized removal from a vehicle of a wheel item such as a wheel hub, a wheel assembly and a wheel accessory, the alarm system comprising:

a sensing device having a secured state when the wheel item is installed on the vehicle, and an unsecured state when the wheel item is removed from the vehicle;

alarm transmitting means, connected to the sensing device for altering a radio frequency (RF) alarm signal when the sensor changes from the secured state to the unsecured state; and receiving means, located remotely from the alarm transmitting means, for generating an alarm triggering signal when the alarm transmitting means alters the RF alarm signal.

30. The alarm system of claim 29 wherein altering the RF alarm signal includes terminating the alarm signal.

31. The alarm system of claim 29 wherein altering the RF alarm signal includes initiating the RF alarm signal when the alarm transmitting means normally does not transmit an RF signal.

32. The alarm system of claim 29 wherein altering the RF alarm signal includes initiating the RF alarm signal when the alarm transmitting means normally does not transmit an RF signal.

33. The alarm system of claim 29 wherein altering the RF alarm signal includes at least one of varying the power and varying the frequency of the RF signal.

* * * * *